United States Patent [19]

Watkins

[11] Patent Number: 5,560,233
[45] Date of Patent: Oct. 1, 1996

[54] AIR BRAKE VALVE SHACKLE

[76] Inventor: Gerald Watkins, Rte. 1, Box 129, Republic, Mo. 65738

[21] Appl. No.: 439,700

[22] Filed: May 12, 1995

Related U.S. Application Data

[63] Continuation of Ser. No. 134,634, Oct. 12, 1993, abandoned, which is a continuation-in-part of Ser. No. 76,208, Jun. 14, 1993, abandoned.

[51] Int. Cl.⁶ .................................................. F16K 35/10
[52] U.S. Cl. ........................... 70/177; 70/178; 70/180; 70/232; 70/DIG. 58; 137/383; 251/90
[58] Field of Search .......................... 70/175–180, 232, 70/DIG. 30, DIG. 58, DIG. 63; 303/89; 137/377, 383; 251/89, 90

[56] References Cited

U.S. PATENT DOCUMENTS

| 508,361 | 11/1893 | Young | 292/DIG. 37 X |
|---|---|---|---|
| 574,755 | 1/1897 | Oehler | 70/DIG. 58 X |
| 1,208,070 | 12/1916 | Woods | 70/203 |
| 1,288,569 | 12/1918 | Hallock | 70/200 |
| 1,371,958 | 3/1921 | Weidner | 70/200 |
| 1,752,613 | 4/1930 | Proffen | 70/237 |
| 1,815,417 | 7/1931 | Miller | 70/202 X |
| 2,500,375 | 3/1950 | Parker | 70/14 |
| 2,749,738 | 6/1956 | Frost | 70/232 |
| 2,984,096 | 5/1961 | Putman et al. | 70/232 |
| 3,067,630 | 12/1962 | Hartman | 74/608 |
| 3,505,839 | 4/1970 | Pavek | 70/230 |
| 3,522,746 | 8/1970 | Reynolds | 74/526 |
| 3,556,571 | 1/1971 | Laub, Jr. | 70/DIG. 58 X |
| 3,729,963 | 5/1973 | Hintz | 70/199 X |
| 4,030,323 | 6/1977 | Stanislawczyk | 70/202 X |
| 4,069,692 | 1/1978 | Hemphill | 70/212 X |
| 4,330,157 | 5/1982 | Sebo | 303/71 X |
| 4,738,126 | 4/1988 | Haberle | 70/14 |
| 4,779,433 | 10/1988 | Légaré | 70/231 X |
| 4,831,850 | 5/1989 | Wong et al. | 70/202 |
| 4,836,570 | 6/1989 | Lopez et al. | 280/507 |
| 4,876,865 | 10/1989 | Trinidad et al. | 70/203 |
| 4,881,388 | 11/1989 | Pruim | 70/175 |
| 4,914,969 | 4/1990 | Lieb | 74/476 |
| 5,207,315 | 5/1993 | Benda | 70/164 X |
| 5,375,916 | 12/1994 | Cook | 70/177 X |

FOREIGN PATENT DOCUMENTS

| 754327 | 11/1933 | France | 70/207 |
|---|---|---|---|
| 849539 | 11/1939 | France | 70/207 |
| 628058 | 8/1949 | United Kingdom | 70/232 |

Primary Examiner—Lloyd A. Gall
Attorney, Agent, or Firm—Kokjer, Kircher, Bowman & Johnson

[57] ABSTRACT

A locking device for air brake valves on vehicles is provided which comprises releasable elements for engaging an air brake valve control knob at the dashboard of the vehicle to prevent the control knob from being pushed inwardly to release the air brakes when the locking device is properly secured in place between the head of the control knob and the dashboard of the vehicle. A first element and a second element are adapted to be coupled together about the shaft of the control knob, and locked together. A portion for engaging the head of the control knob prevents removal of the head from the shaft of the control knob.

8 Claims, 3 Drawing Sheets

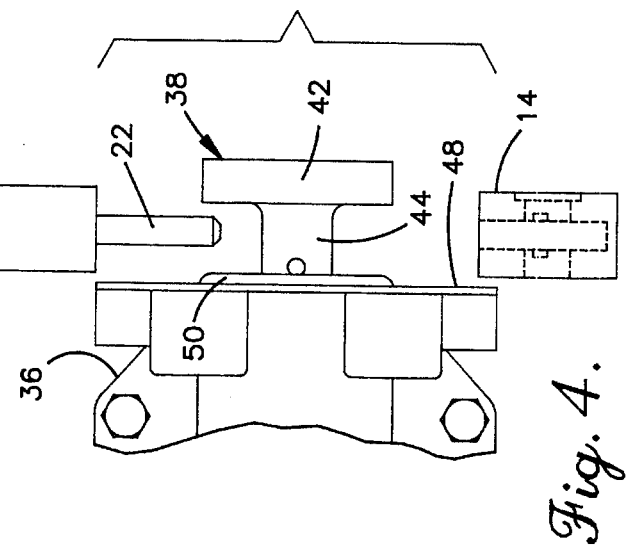
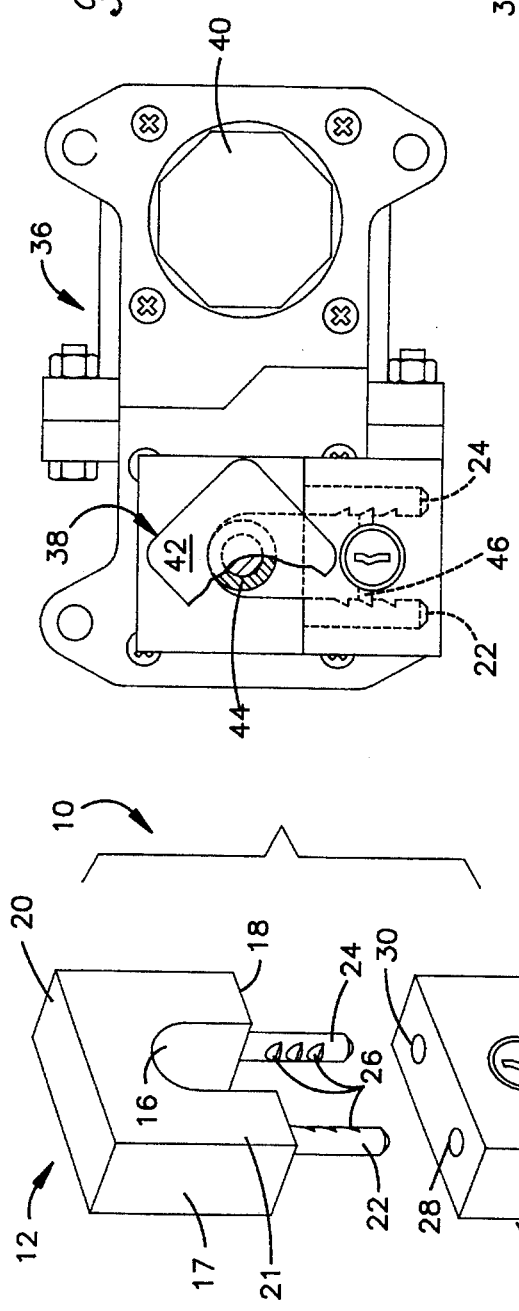
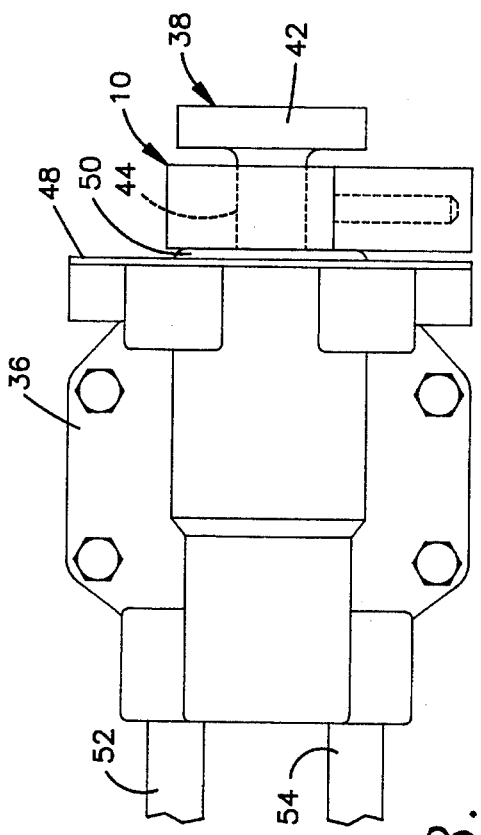

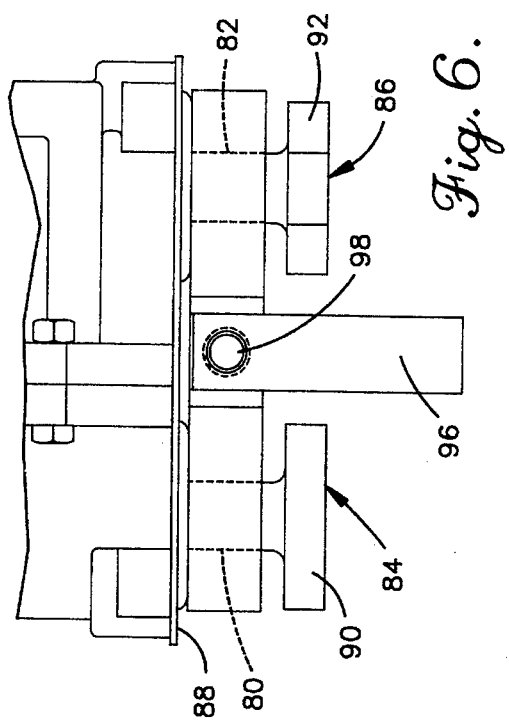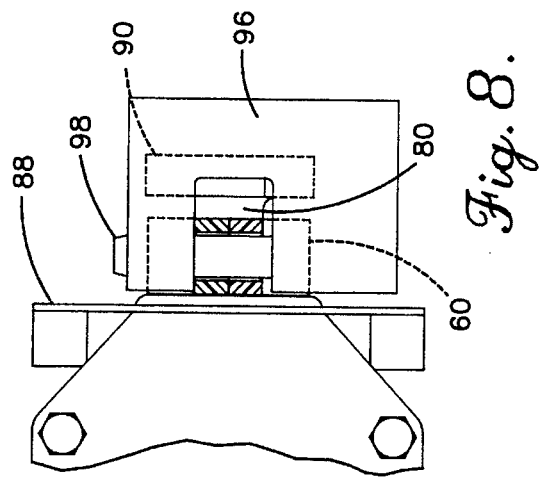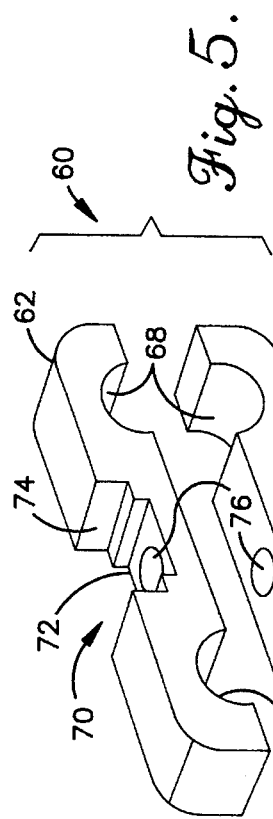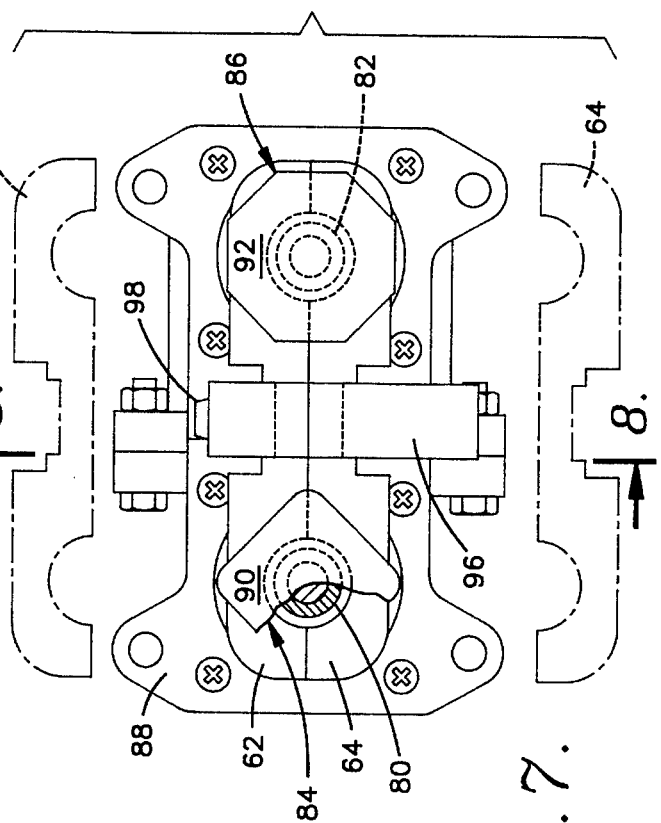

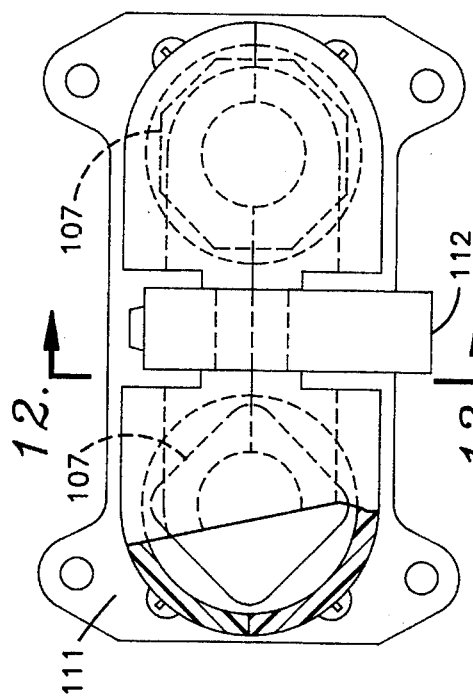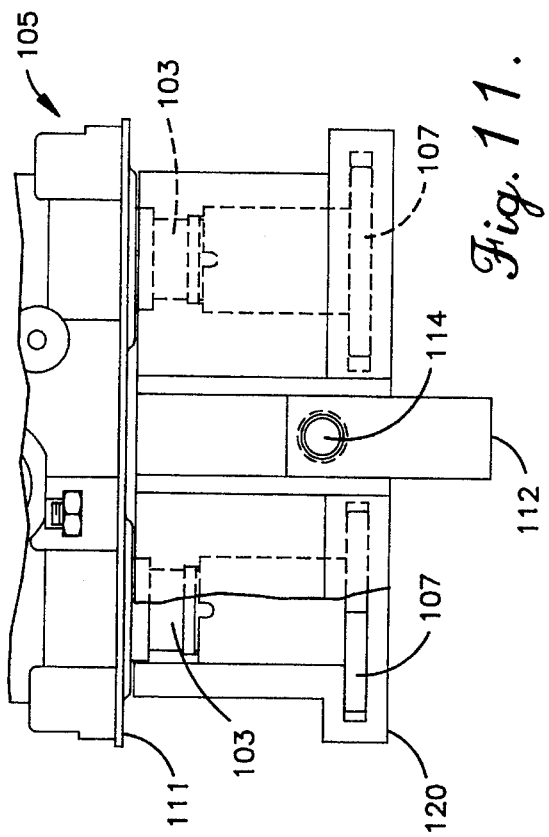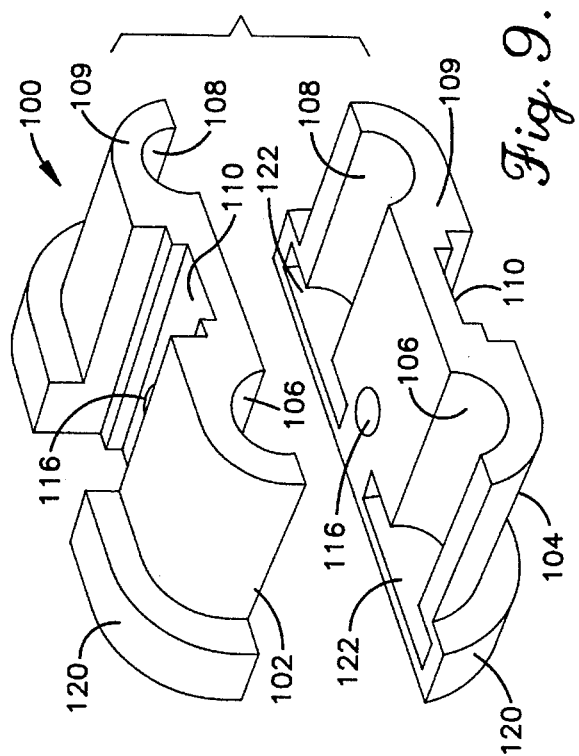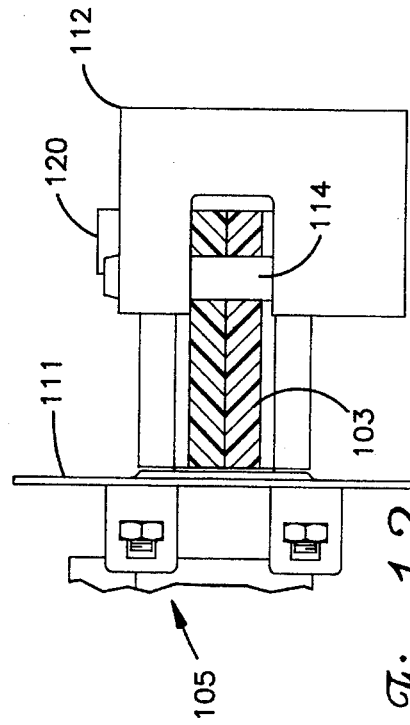

AIR BRAKE VALVE SHACKLE

CROSS-REFERENCE TO RELATED APPLICATIONS

This is a continuation of Application Ser. No. 08/134,634, filed Oct. 12, 1993, now abandoned, which is a continuation-in-part of application Ser. No. 08/076,208, filed Jun. 14, 1993, now abandoned.

BACKGROUND OF THE INVENTION

1. Field of the Invention

The present invention generally relates to a locking device to be used in conjunction with a brake valve knob on a vehicle. In particular, the present invention relates to a shackle for the brake valve of a vehicle having air brakes. The shackle of the present invention is useful in preventing the inadvertent or intentional movement of the brake valve knob in a manner necessary to release the brakes.

2. Description of the Related Art

Many vehicles, and particularly large over-the-road trucks, have air brakes. As with other types of brakes, air brakes stop or hold a vehicle from movement by causing a disk or drum to apply friction to the wheels of the vehicle. However, in contrast to other types of brakes which may use mechanical, electrical, or hydraulic power to activate the brake, air brakes use air to apply the brake drum or disk. In this regard, when an air brake is activated, an air pump creates an air pressure differential in the air brake system which causes the brakes to be applied.

In most trucks, the air brakes are controlled by the operator from the cab of the vehicle. Particularly, a knob located on the dashboard of the vehicle is connected to an air valve located just behind the dashboard. Typically, pulling the knob outwardly activates the air valve and causes the brakes to be set. Pushing the knob inwardly releases the brakes.

Air brakes are particularly useful with large vehicles used in the trucking industry primarily because they permit full brake force to remain applied even when the vehicle is not in use. However, the dangers to both equipment and operators are great in the event the air brakes are inadvertently released and the truck is placed in motion. Moreover, it will be appreciated that operators of large trucks often desire to leave the engine running, with the keys in the ignition, during times when they must leave the truck unattended. Due to problems inherent in shutting off and restarting diesel engines, many drivers prefer to leave the engine running even when they desire to or must leave the vehicle unattended for a fairly long period of time, such as for example, during a time of sleep or rest from the rigors of the road. Air brakes are particularly useful during these times because they may be applied mechanically, by activating the air valve, and the brakes will be held on even though the vehicle is not in use.

The inherent problems associated with leaving an unattended vehicle running are apparent. It is not uncommon for thieves, at truck stops and the like, to unscrupulously and impermissibly enter a truck with the engine running, release the air brakes by pushing in the air brake valve knob, and drive off with the vehicle. Such losses by theft are significant when considering the cost of today's vehicles and the cargo they carry. Additionally, with the elaborate sleeping facilities available on many of today's trucks, the risk of bodily harm to a driver who might be sleeping within the truck when a thief breaks in and begins driving the truck is great in the absence of something to deter the thief from moving the vehicle.

U.S. Pat. No. 3,522,746 shows a safety device for vehicles for preventing the inadvertent movement of a control lever on the dashboard of a truck. The device incorporates a plate for preventing the lateral movement of a lever located on the dashboard. Particularly, the plate must be pivoted downwardly out of the way of the control lever to permit the lever to be moved laterally. However, the device is not adapted to prevent inward or outward movement of a knob. Moreover, the device does not deter unauthorized movement of a control lever, but only inadvertent movement.

SUMMARY OF THE INVENTION

An object of the present invention is to provide a locking device for air brake knobs for substantially deterring or preventing the inadvertent and unauthorized intentional release of air brakes.

Another object of the present invention is to provide a locking device adapted to snugly fit between the dashboard of a vehicle and the head of a knob for setting and releasing air brakes, which knob extends from the dashboard.

Another object of the present invention is to provide a locking device that will substantially deter or prevent undesirable movement of the vehicle.

Another object of the present invention is to provide a shackle for substantially circumscribing at least a portion of an article to be locked.

These and other objects are achieved by a removable shackle adapted to engage the actuating knob of an air brake valve. In the preferred embodiment, the shackle of the present invention comprises first and second locking portions adapted to be coupled together around at least a portion of a knob for actuating and releasing air brakes on a vehicle.

Particularly, one of the locking portions has at least one aperture for receiving at least one leg member extending outwardly from the other locking portion. Preferably, the two locking portions are locked together using conventional locking techniques, such as using a key to position a locking bar in such a way that the two locking portions cannot be separated. In this regard, the leg member is formed with at least one groove in which a locking bar is received when the locking portions of the present invention are coupled together and locked. It should be understood that other locking and unlocking techniques, such as those employed by combination locks, are contemplated. Moreover, it should be understood that the present invention may be constructed to lock automatically upon interconnection of the locking portions, such as is typically the case with many pad locks, in which case the user would need the appropriate key or combination to unlock the lock, or, the present invention may be constructed in such a manner that the two locking portions will not automatically lock upon being interconnected, but must physically be locked by known methods of locking, such as turning a key.

More specifically, a substantially U-shaped elongate channel extends from an outer edge of the first locking portion to a location intermediate the edges of the first locking portion. This channel is adapted to fit snugly about the shaft of a knob for actuating air brakes on a vehicle. Particularly, the channel extends from the outer edge of the first locking portion such that the base of the U-shaped channel, defined by the curved portion thereof, is located intermediate the edges of the first locking portion. In the preferred embodiment, at least one leg member extends outwardly from the end of the first locking portion to be received in an aperture located in the second locking portion. It will be understood by those with skill in this art that either locking portion could have one or more leg members, and similarly, either locking portion could have one or more apertures. It is also contemplated that each locking portion could have any feasible number of both legs and apertures for interconnecting and locking together the two portions. Preferably, a pair of leg members are employed such that one leg member is located on the end of the first locking portion at each side of the opening of the U-shaped channel.

The locking device of the present invention is adapted to be placed around the shaft of a brake valve knob after the brakes of a vehicle have been set by pulling the knob outwardly from the dashboard of the vehicle. The locking device of the present invention is preferably rectangular in shape with dimensions such that the locking device fits tightly and snugly between the head of the brake valve knob and the dashboard. Such a tight fit will reduce or prevent the ability of thieves or vandals to pry at either the lock or the head of the brake valve knob in an effort to remove it in an unauthorized manner.

In an alternative embodiment of the present invention, a yoke is provided for locking each of a pair of air brake valve control knobs in an outward position. Preferably, the yoke is comprised of two symmetrical bars adapted to engage and at least partially circumscribe the shaft of each air brake valve control knob and to be positioned intermediate the dashboard of the vehicle and the rearward side of the head of the control knob. Preferably, a first bar is positioned over the top of the control knobs, and a second bar is positioned about the shaft of the control knobs from the bottom. A locking mechanism is utilized to lock the first and second bar in place.

In a variation of the yoke embodiment, the yoke is constructed so that, in addition to circumscribing at least a portion of the shafts, it also circumscribes at least a portion of the head of the control knobs at the outermost ends of the shafts. Preferably, each bar of the yoke has a face with a recessed cavity for engaging a portion of the head of the control knob. The device of this embodiment is particularly useful in conjunction with control knobs which are made to be removable from the shafts.

BRIEF DESCRIPTION OF THE DRAWINGS

The objects and features of the invention noted above are explained in more detail with reference to the drawings, in which like reference numerals denote like elements, and in which:

FIG. 1 is a perspective view of the locking shackle of the present invention;

FIG. 2 is a front plan view of a typical air brake actuation system showing the present invention in place;

FIG. 3 is a side view of a typical air brake actuation system showing the present invention in place; and FIG. 4 is a side view of the present invention shown exploded.

FIG. 5 is a perspective view of the yoke shackle of an alternate embodiment of the present invention;

FIG. 6 is a top plan view of a typical air brake actuation system showing the alternate embodiment of FIG. 5 in place;

FIG. 7 is a front plan view of a typical air brake actuation system showing the alternate embodiment of FIG. 5 in place;

FIG. 8 is a side view taken along line 8—8 of FIG. 7;

FIG. 9 is a perspective view of an alternate preferred embodiment of the present invention;

FIG. 10 is a front plan view of a typical air brake actuation system showing the alternate embodiment of FIG. 9 in place;

FIG. 11 is a top plan view of the alternative embodiment of FIG. 9; and

FIG. 12 is a side view taken along line 12—12 of FIG. 10.

DETAILED DESCRIPTION OF THE INVENTION

With reference to FIG. 1, the preferred embodiment of the air brake valve shackle of the present invention is generally denoted by the reference numeral 10. Elements of shackle 10 are preferably made of hard gauge steel. Shackle 10 is comprised of a first locking portion 12 and a second locking portion 14. Preferably, elements 12 and 14 are substantially rectangular in shape, although they can be formed in any desired shape. Edgewalls 17 and 19 extend between opposing faces of locking elements 12 and 14 respectively. It will be appreciated that, in the embodiment shown, elements 12 and 14 are substantially solid bodies.

A substantially U-shaped channel 16 extends inwardly from edge 18 of first locking portion 12. It should be understood that channel 16 extends entirely through first locking portion 12 from its front face 21 to its rear face, which is the face opposite front face 21. Furthermore, it should be understood that the shape of channel 16 is not limited to U-shaped, but could take on other geometric configurations as well.

A pair of leg members comprised of legs 22 and 24 extend outwardly from the end of first locking portion 12 that is adjacent edge 18. As shown in FIG. 1, it is preferred that one leg is positioned on each side of the opening of channel 16. Each leg member has grooves 26 located along its length. Leg members 22 and 24 are adapted to be received by apertures 28 and 30 located in second locking portion 14.

First and second locking portions may be locked together in a variety of known ways. A key hole 34 for locking together first locking portion 12 and second locking portion 14 is located in one face of second locking portion 14. It will be understood that shackle 10 is not limited to key operation, but may employ other locking methods, such as a combination-type lock, if desired. Furthermore, it should be understood that the precise embodiment shown in FIG. 1 is for illustrative purposes, and many possible variations will be recognized by those skilled in this art. For instance, legs 22 and 24 could extend from the second locking portion 14 instead of first locking portion 12, in which case first locking portion 12 would have apertures for receiving the legs. Alternatively, each locking portion could incorporate at least one leg and at least one aperture. Additionally, it should be understood that any feasible number of legs and accompanying apertures could be utilized. Moreover, it should be understood that first and second locking portions 12 and 14 may be permanently connected in some manner even when they are not locked together. In this regard, the two locking portions could be constructed to operate in a hinging manner.

Referring now to FIG. 2, shackle 10 is shown in place on an air valve actuating unit 36 as may be commonly employed on the dashboard of a vehicle. Various screws and bolts are shown on actuating unit 36 which are a part of its construction and are not pertinent to the present invention.

The unit 36 shown in FIG. 2 comprises a first knob 38 for activating a valve connected to a first set of air brakes and a second knob 40, perhaps for activating a second set of air brakes. Knob 38 is shown with a portion broken away and hidden parts of shackle 10 are shown in broken lines so that shackle 10 may be better visualized. Particularly, knob 38 is comprised of a head 42 and a typically cylindrical shaft 44 extending from the rearward side of knob 38, through the dashboard, to an air valve located on the rearward side of the dashboard of the vehicle.

As shown in FIG. 2, shackle 10 has been placed about a portion of knob 38 after knob 38 has been pulled outwardly to set the air brakes. Particularly, shaft 44 of knob 38 is received in channel 16 of locking portion 12. Legs 22 and 24 straddle shaft 44 and are received in apertures 28 and 30, respectively, of locking portion 14. Locking portions 12 and 14 are locked together by causing locking bar 46, located within a cavity in locking portion 14, to become engaged in at least one groove 26 on at least one of legs 22 or 24.

Referring now to FIG. 3, shackle 10 is dimensioned to fit between head 42 of knob 38 and dashboard 48. In the embodiment shown, the actuating unit 36 has a small lip 50 located around shaft 44. The portion of unit 36 located behind dashboard 48 comprises a valve portion and conduits, as shown by reference numerals 52 and 54, for activating the air brakes. As shown in FIG. 3, knob 38 has been pulled outwardly from dashboard 48 to set the air brakes of the vehicle. Shackle 10 is shown positioned in place to prevent knob 38 from being pushed inwardly to release the brakes. Moreover, the dimensions of shackle 10 are such that shackle 10 snugly fits between head 42 of knob 38 and dashboard 48 when shackle 10 is in place. With the shackle 10 in place and locked about shaft 44 of knob 38, the air brakes cannot be released in an inadvertent or unauthorized manner. The snug fit of shackle 10 makes it extremely difficult or impossible to pry shackle 10 out of position or to pry the head 42 off of knob 38. In this regard, it is preferred that the dimensions of shackle 10 are such that the front face of shackle 10 substantially or approximately abuts the rear of head 42 of knob 38 while the rear face of shackle 10 substantially or approximately abuts dashboard 48. Further, it is preferred that locking portions 12 and 14 are shaped substantially as rectangular boxes with a thickness from their front to back faces of approximately three-fourths of an inch (¾"). It has been found that such a thickness serves the purposes of this invention well when used in conjunction with commercially available air brake valve assemblies. It will-be understood that other appropriate dimensions may be utilized.

As shown in FIG. 4, use of shackle 10 is accomplished by engaging locking portions 12 and 14 about shaft 44 of knob 38. Particularly, it is contemplated that shackle 10 substantially circumscribe at least a portion of shaft 44. The locking portions 12 and 14 are locked together or released by the locking mechanism shown in dashed lines. Preferably, this locking mechanism is operated with a key to cause a locking bar to engage or disengage, as the case may be, one or more grooves in the legs which extend into locking portion 14. As shown, the shackle 10 is easily put into place to lock knob 38, and hence the air brake valve of which it is a part. Removal of shackle 10 is similarly easy after it has been unlocked.

Referring now to FIG. 5, an alternate embodiment of the present invention, generally referred to as a yoke shackle 60, is shown. Preferably, yoke shackle 60 is adapted to prevent movement of a pair of air brake valve control knobs. It will be appreciated that the preferred embodiment of the present invention may be adapted to shackle one or more air brake valve control knobs. However, yoke shackle 60 is preferably adapted to shackle two valves, since air brake valve actuating mechanisms commonly include two control valves and corresponding control knobs. For instance, on a tractor-trailer rig, one valve may actuate the air brakes for the tractor, and the other air valve may actuate the air brakes on the trailer. Yoke shackle 60 is generally comprised of bars 62 and 64. In the preferred embodiment, bars 62 and 64 are symmetrical and are made of fiberglass. It has been found that the fiberglass construction provides a strong, yet light-weight device for locking air brake valves that is less likely to scratch the dashboard of the vehicle than a metallic embodiment. However, it should be understood that yoke shackle 60 may be made of metal, durable plastic, or other known and suitable materials.

Each bar 62 and 64 has cavities 66 and 68, preferably in the form of a semicircle. A notched area 70 in each bar 62 and 64 has an inner groove 72 of a first width and an outer groove 74 defined by a second, greater width. An opening 76 is provided at substantially the center of the inner groove 72 of each bar 62 and 64.

With reference now to FIGS. 6–8, yoke shackle 60 is adapted to be positioned such that cavities 66 and 68 of each bar 62 and 64 receive shafts 80 and 82 of air brake valve control knobs 84 and 86. It will be understood that the control knobs are shown side-by-side for illustrative purposes only, and that the knobs could be positioned in a vertical relationship in which case bars 62 and 64 would be placed at opposite sides of the knobs. As best seen in FIG. 7, one of the bars 62 or 64 is positioned at the bottom of air brake valve control knobs 84 and 86, while the other bar is positioned at the top of the control knobs 84 and 86. As shown in FIG. 7, the bars 62 and 64 shown in broken lines represent yoke shackle 60 prior to its placement for locking control knobs 84 and 86 in an outward position. Bars 62 and 64 are placed together in such a manner that cavities 66 and 68 of each bar 62 and 64 surround shafts 80 and 82. Preferably, yoke shackle 60 is dimensioned so that it substantially occupies the space between the dashboard 88 and the rearward side of heads 90 and 92 of control knobs 84 and 86, respectively, when the control knobs are pulled outwardly to set the air brakes.

With reference still to FIGS. 6–8, a lock 96 is utilized to lock together bars 62 and 64 so that they cannot be removed without unlocking lock 96. Preferably, lock 96 is in the form of a vice or other clamping type lock. Lock 96 is adapted to fit within the notching area 70 of each bar 62 and 64. Inner groove 72 and outer groove 74 are provided to accommodate different lock widths, and are preferably of a dimension to accommodate known, commercially available locks. It will be understood that while two grooves are shown, one or more grooves may be provided. For instance, a lock marketed under the trade name BARJAN works well with the present invention. As shown in FIGS. 7 and 8, such a lock fits within inner groove 72 of yoke shackle 60 and has a rod member 98 for insertion through openings 76 in bar 62 and 64.

Preferably, the locking device shown in FIGS. 5–8 comprises a first bar 62 and a second bar 64 having cavities 66 and 68 adapted to respectively circumscribe the shafts of control knobs with which they are associated, namely shaft 80 of control knob 84 and shaft 82 of control knob 86, when the first bar 62 and second bar 64 are combined in accordance with the principles of this invention. The notch area 70 of each bar 60 and 62 is preferably located at a location intermediate said cavities 66 and 68 and on a face opposite said cavities. The opening 76 is preferably substantially centered between said cavities and is located within said notch area 70.

Referring now to FIGS. 9–12, an alternate preferred embodiment of the present invention is shown and described.

A shackle 100 is comprised of a first portion 102 and a second portion 104. Similar to the embodiment shown in FIGS. 5–8, each of first portion 102 and second portion 104 of shackle 100 have cavities 106 and 108 for receiving a portion of shafts 103 of air brake valve assembly 105. Recessed notch areas 110 provide grooves to accommodate different sized locks. As shown in FIGS. 9–12, lock 112 has a member 114 which is received in aperture 116 of each of first portion 102 and second portion 104 for holding shackle 100 in place.

Additionally, each portion 102 and 104 of shackle 100 has a front element 120 with recessed areas 122 adapted to at least partially cover heads 107 of control knobs. In this regard, each portion 102 and 104 is preferably one integral piece and is identical to the other to keep construction and tooling costs at a minimum. However, it should be understood that it is only necessary for one of portion 102 or portion 104 to have means for partially encompassing a head 107 of a control knob to be locked. Preferably, when portions 102 and 104 are brought together for locking the control valve assembly, heads 107 of control knobs are housed within shackle 100, and particularly, within recessed areas 122 of each front element 120 of first portion 102 and second portion 104. In this way, front elements 120 act as pockets for receiving a portion of the head 107 of a control knob 116. Preferably, each front element 120 covers about one-half of the head 107. When shackle 100 is in place on control valve assembly 105, rear face 109 of each of first portion 102 and second portion 104 abut face 111 of control valve assembly 105.

The purpose of front element 120 having recessed areas 122 is primarily to prevent removal of the heads 107 of control knobs from shafts 103. In this regard, some control valve assemblies of the type discussed herein have heads which may be removed. For instance, one such control valve assembly utilizes a threaded shaft and a threaded control knob head whereby the control knob head may be easily screwed on and off the shaft. As can be seen best in FIGS. 10 and 12, shackle 100, when in place on the control valve assembly, restricts access to control knobs thereby preventing their removal. Additionally, shackle 100 prevents heads 107 of the control knobs from being broken, pulled, pried or otherwise removed from shafts 103.

It should accordingly be understood that front element 120 can be constructed in a variety of manners to accomplish its purposes. It will be appreciated that it is not necessary that front element 120 entirely enclose a head 107 of a control knob 116, but could be constructed to only partially enclose the knob to prevent removal of the knob. Further, shackle 100 could be constructed such that first portion 102 and second portion 104 snugly engage the outer periphery of the control knobs. In such an embodiment, only the face of the control knobs would be visible when shackle 100 is in place.

It should also be understood that the embodiment of the present invention shown in FIGS. 1–4 can be adapted to include a portion for extending about at least a portion of the head of the control knob.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described my invention, I claim:

1. A locking device, for preventing access to a pair of valve knobs controlling the release of air brakes on a vehicle, each said valve knob comprising an elongate shaft terminating in an outer head, said locking device comprising:

an upper body having a pair of spaced-apart wells, each said well comprising a channel terminating in a recessed pocket, wherein each said channel and recessed pocket receive and completely cover, respectively, an upper half of the shaft and head of a corresponding one of said valve knobs;

a lower body, formed identically to said upper body, wherein said lower body has a pair of spaced-apart wells, each said well comprising a channel terminating in a recessed pocket, wherein each said channel and recessed pocket receive and completely cover, respectively, a lower half of the shaft and head of a corresponding one of said valve knobs; and a lock for locking said upper body and said lower body together about said valve knobs.

2. The locking device as set forth in claim 1 wherein said upper body and said lower body are not hingedly attached to each other.

3. The locking device as set forth in claim 1 wherein said upper body and said lower body each have an aperture therethrough at a location between said spaced-apart wells, said apertures for receiving a portion of said lock.

4. The locking device as set forth in claim 3 wherein said upper body and said lower body each have a notched area at an outer surface thereof, said aperture of each said body being positioned in said notched area, wherein a portion of said lock is received in said notched area of each said body.

5. The locking device as set forth in claim 1 wherein said upper body and said lower body are attached only by said lock.

6. The locking device as set forth in claim 1 wherein each of said upper body and said lower body has a front area and a rear face, wherein said recessed pockets are in said front areas, and wherein said channels in each said body extend to said rear face thereof.

7. A locking device, for preventing access to a pair of valve knobs controlling the release of air brakes on a vehicle, each said valve knob comprising an elongate shaft terminating in an outer head, said locking device consisting essentially of:

an upper body having a pair of spaced-apart wells, each said well comprising a channel terminating in a recessed pocket, wherein each said channel and recessed pocket receive and completely cover, respectively, an upper half of the shaft and head of a corresponding one of said valve knobs;

a lower body, formed identically to said upper body, wherein said lower body has a pair of spaced-apart wells, each said well comprising a channel terminating in a recessed pocket, wherein each said channel and recessed pocket receive and completely cover, respectively, a lower half of the shaft and head of a corresponding one of said valve knobs; and a lock for locking said upper body and said lower body together about said valve knobs, wherein said upper body and said lower body each have an aperture therethrough, said apertures adapted to align with each other when said upper and lower bodies are positioned about said valve knobs, said apertures for receiving a portion of said lock.

8. A locking device, for preventing access to a pair of valve knobs controlling the release of air brakes on a vehicle, each said valve knob comprising an elongate shaft terminating in an outer head, said locking device comprising:

an upper body, having a first outer surface with a pair of spaced-apart channels therein, wherein each said channel receives and completely covers an upper half of the shaft of a corresponding one of said valve knobs;

a lower body, formed identically to said upper body, wherein said lower body has a first outer surface with a pair of spaced-apart channels therein, wherein each said channel receives and completely covers a lower half of the shaft of a corresponding one of said valve knobs;

said upper and lower bodies each having a second outer surface, opposite said first outer surface, said second outer surface having a notched area at a central portion thereof;

said upper and lower body each having an aperture located in said notched area thereof, each said aperture extending, through its respective body, to said first outer surface at a location between said channels, and wherein said apertures align with each other when said upper and lower bodies are positioned about the shafts of said valve knobs; and a lock for locking said upper and lower bodies about said shafts, said lock adapted to be partially received by said notched areas of said upper and lower bodies, said lock further having a post adapted to be inserted through said apertures when said apertures are aligned.

* * * * *